Patented Jan. 25, 1938

2,106,539

UNITED STATES PATENT OFFICE 2,106,539

STABLE DIAZO SALT PREPARATIONS AND PROCESS OF PREPARING THEM

Karl Schnitzspahn, Offenbach-on-the-Main, Germany, assignor to General Aniline Works, Inc., New York, N. Y., a corporation of Delaware No Drawing. Application July 7, 1934, Serial No. 734,197. In Germany July 13, 1933

5 Claims. (Cl. 23—250)

This invention relates to an improved process of preparing stable diazo-salt preparations on the basis of diazonium sulfates and to the preparations obtained by this process.

The literature (cf., for instance, Griess, Annalen der Chemie, 137, (1866), page 39; Knoevenagel, Berichte der Deutschen Chemischen Gesellschaft, 28, (1895), page 2994) discloses processes for separating diazonium sulfates in solid form, but the methods of working proposed therein cannot be considered for the manufacture thereof on a technical scale. An economical production on a technical scale is only possible if the methods correspond with the methods usually applied in the works, so that, for instance, a diazotization in alcohol, as suggested by Knoevenagel in Berichte de Deutschen Chemischen Gesellschaft, 28, (1895), page 2994, and separation of the diazonium salt by means of ether are not feasible. The separation of diazonium sulfates from their aqueous mineral acid solutions, as they are obtained at normal diazotization, by simple technical measures as, for instance, salting out is, however, not possible owing to the great solubility of most of the diazonium sulfates.

Now, the present invention offers a new and original way of preparing diazonium sulfates in solid form and converting them into stable commercial diazo preparations. More particularly, it relates to a process which comprises separating in solid form diazonium sulfates from aromatic monoamines of the benzene series containing at least one negative group, such as halogen or the nitro group, by diluting diazo solutions which are obtainable by diazotizing these amines in sulfuric acid of high concentration with such organic liquids as are miscible with or soluble in sulfuric acid, preferably at low temperature, isolating the separated diazonium sulfates and mixing the dry or almost dry diazonium sulfates, thus obtained, with such a quantity of a mild alkaline agent as corresponds to the sulfuric acid which may adhere mechanically to the diazonium sulfate and, moreover, is equivalent to the acidity of the acid diazonium sulfate, that is, one equivalent of the alkaline agent for one mol. of acid diazonium sulfate. If necessary, suitable adjuvants and diluents may be added to the diazonium salts.

The aromatic amines which may be used in the present process are mono-, di- and polyhalogenaminobenzenes, nitroaminobenzenes, dihalogentoluidines and dihalogenaminophenolethers, 1-amino-4-methyl-3-halogenbenzenes, 1-amino-2-methyl-3-halogenbenzenes, 1-amino-5-chloro-2-alkoxy- and -aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, as well as 2-amino-4-nitro- and 4-amino-3-nitro-1-phenolethers.

As suitable organic liquids may be named, for example, the low members of the aliphatic alcohols and ketones.

The separated diazonium sulfates may be mixed, for example, with the following mild alkaline agents: sodium carbonate, sodium bicarbonate, sodium borate or sodium acetate, magnesia and zinc hydroxide or calcium hydroxide; as adjuvants or diluents there may be used: partly dehydrated aluminium or magnesium sulfate, anhydrous sodium sulfate or metal salts of arylsulfonic acids.

According to the process described there may be obtained solid, stable and easily soluble diazo-salt preparations. Their aqueous solutions may be used without any further addition for the production of ice colors.

The following examples serve to illustrate the invention, but they are not intended to limit it thereto; the parts are by weight:

(1) 226 parts of acid sulfate of ortho-chloroaniline are introduced, while cooling, into a solution of 130 parts of nitrosyl-sulfuric acid in 180 parts of sulfuric acid of 84% strength. The whole is stirred until the diazotization is finished; thereupon the concentrated sulfuric acid diazo-solution, thus obtained, is stirred into 690 parts of ethyl-alcohol or n-propylalcohol, while cooling. Immediately the separation of the diazonium sulfate begins and is completed by cooling to $-15°$ C. The diazonium sulfate is filtered and mixed with 100 parts of anhydrous sodium sulfate and dried at about 45° C. 250 parts of partly dehydrated aluminium sulfate of about the composition $Al_2(SO_4)_3.9H_2O$ and 60 parts of anhydrous sodium carbonate are then mixed with the diazonium sulfate.

(2) 162 parts of 2.5-dichloroaniline are diazotized with a solution of 133 parts of nitrosylsulfuric acid in 163 parts of sulfuric acid of 86% strength. The concentrated sulfuric acid diazo solution is stirred, while cooling, into 400 parts of methanol or ethanol. The separated diazonium sulfate is filtered at low temperature, mixed with 200 parts of anhydrous sodium sulfate and dried at about 45° C. 240 parts of partly dehydrated aluminium sulfate of the composition mentioned in Example 1, 16 parts of magnesia and 35 parts of anhydrous sodium carbonate are then mixed with the diazonium sulfate.

In a corresponding manner the diazonium sulfates from 2.3.4- or 2.4.5-trichloroaniline may be separated and worked up to form diazosalt preparations.

(3) 73 parts of dry sodium nitrite are dissolved in 540 parts of warm sulfuric acid of 90% strength. After cooling, 138 parts of ortho-nitroaniline are introduced at about 20° C. to 25° C. and the whole is stirred until the diazotization is complete. The diazo solution is then poured, while cooling, into 1300 parts of methanol and the separation of the diazonium sulfate is completed by cooling. The diazonium sulfate is filtered and then mixed in the moist state with a mixture of 150 parts of dry borax of about the composition $Na_2B_4O_7.2H_2O$ and 220 parts of partly dehydrated aluminium sulfate of the composition mentioned in Example 1.

Instead of diazotizing with a solution of 73 parts of sodium nitrite in 540 parts of sulfuric acid it is also advantageous to use for the diazotizing operation a solution of 133 parts of nitrosyl-sulfuric acid in 165 parts of sulfuric acid of 85% strength.

Instead of methanol there may also be used ethanol, propanol, butanol, acetone or other organic liquids miscible with sulfuric acid having a strength of about 75% to 80% after complete diazotization.

For the production of the diazo-salt preparations the quantity of the alkaline agent which has to be added must be calculated upon the total acidity of the filtered moist diazonium sulfate.

In a corresponding manner diazonium sulfates and diazo-salt preparations may be obtained from other halogen- or nitro-substituted aminobenzenes, as well as from other aromatic amines above named.

I claim:

1. The process of preparing stable diazosalt preparations on the basis of diazonium sulfates which comprises separating in solid form diazonium sulfates from aromatic monoamines of the benzene series selected from the group consisting of mono-, di- and polyhalogenaminobenzenes, nitroaminobenzenes, dihalogentoluidines and dihalogenaminophenol ethers, 1-amino-4-methyl-3-halogenbenzenes, 1-amino-2-methyl-3-halogenbenzenes, 1-amino-5-chloro-2-alkoxy- and aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, 2-amino-4-nitro- and 4-amino-3-nitro-1-phenolethers, by diluting with organic liquids miscible with sulfuric acid the diazo solutions obtainable by diazotizing these amines in sulfuric acid of high concentration, isolating the separated diazonium sulfates and mixing them with the quantity of a mild alkaline agent which corresponds to the sulfuric acid mechanically adhering to the diazonium sulfate plus the quantity equivalent to the acidity of the acid diazonium sulfate.

2. The process of preparing stable diazosalt preparations on the basis of diazonium sulfates which comprises separating in solid form diazonium sulfates from aromatic monoamines of the benzene series selected from the group consisting of mono-, di- and polyhalogenaminobenzenes, nitroaminobenzenes, dihalogentoluidines and dihalogenaminophenolethers, 1-amino-4-methyl-3-halogenbenzenes, 1-amino-2-methyl-3-halogenbenzenes, 1-amino-5-chloro-2-alkoxy- and aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, 2-amino-4-nitro- and 4-amino-3-nitro-1-phenolethers, by diluting with organic liquids miscible with sulfuric acid the diazo solutions obtainable by diazotizing these amines in sulfuric acid of high concentration, isolating the separated diazonium sulfates and mixing them with the quantity of an alkali metal salt of weak acids which corresponds to the sulfuric acid mechanically adhering to the diazonium sulfate plus the quantity equivalent to the acidity of the acid diazonium sulfate.

3. The process of preparing stable diazosalt preparations on the basis of diazonium sulfates which comprises separating in solid form diazonium sulfates from aromatic monoamines of the benzene series selected from the group consisting of mono-, di- and polyhalogenaminobenzenes, nitroaminobenzenes, dihalogentoluidines and dihalogenaminophenolethers, 1-amino-4-methyl-3-halogenbenzenes, 1-amino-2-methyl-3-halogenbenzenes, 1-amino-5-chloro-2-alkoxy- and aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, 2-amino-4-nitro- and 4-amino-3-nitro-1-phenolethers, by diluting with a lower alcohol of the aliphatic series the diazo solutions obtainable by diazotizing these amines in sulfuric acid of high concentration, isolating the separated diazonium sulfates and mixing them with the quantity of an alkali metal salt of weak acids which corresponds to the sulfuric acid mechanically adhering to the diazonium sulfate plus the quantity equivalent to the acidity of the acid diazonium sulfate.

4. The process of preparing stable diazosalt preparations on the basis of diazonium sulfates which comprises separating in solid form diazonium sulfates from aromatic monoamines of the benzene series selected from the group consisting of mono-, di- and polyhalogenaminobenzenes, nitroaminobenzenes, dihalogentoluidines and dihalogenaminophenolethers, 1-amino-4-methyl-3-halogenbenzenes, 1-amino-2-methyl-3-halogenbenzenes, 1-amino-5-chloro-2-alkoxy- and aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, 2-amino-4-nitro- and 4-amino-3-nitro-1-phenolethers, by diluting with ethanol the diazo solutions obtainable by diazotizing these amines in sulfuric acid of about 80% to 90% strength with ethanol, isolating the separated diazonium sulfates and mixing them with the quantity of sodium borate which corresponds to the sulfuric acid mechanically adhering to the diazonium sulfate plus the quantity equivalent to the acidity of the acid diazonium sulfate.

5. The process of preparing stable diazosalt preparations on the basis of diazonium sulfates which comprises separating in solid form diazonium sulfates from aromatic monoamines of the benzene series selected from the group consisting of mono-, di- and polyhalogenaminobenzenes, nitroaminobenzenes, dihalogentoluidines and dihalogenaminophenolethers, 1-amino-4-methyl-3-halogenbenzenes, 1-amino-2-methyl-3-halogenbenzenes, 1-amino-5-chloro-2-alkoxy- and aryloxybenzenes, 1-amino-2-nitro-4- and -5-halogenbenzenes, 1-amino-4-chloro-3-nitrobenzene, 1-amino-2-chloro-4-nitrobenzene, 1-amino-2-methyl-4-nitro- and -5-nitrobenzene, 2-amino-4-nitro- and 4-amino-3-nitro-1-phenolethers, by diluting with propanol the diazo solutions obtainable by diazotizing these amines in sulfuric acid of about 80% to 90% strength, isolating the separated diazonium sulfates and mixing them with the quantity of sodium borate which corresponds to the sulfuric acid mechanically adhering to the diazonium sulfate plus the quantity equivalent to the acidity of the acid diazonium sulfate.

KARL SCHNITZSPAHN.